US007933846B2

(12) United States Patent
Collings et al.

(10) Patent No.: US 7,933,846 B2
(45) Date of Patent: Apr. 26, 2011

(54) MAIL PROCESSING SYSTEM INCLUDING DIMENSIONAL RATING WITH TRUE LENGTH SUPPORT

(75) Inventors: Peter T. Collings, Shelton, CT (US); Elaine B. Cristiani, Stratford, CT (US); Brad L. Davies, Derby, CT (US); Robert H. Kummer, Jr., Southbury, CT (US); Mark D. Zamary, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 1027 days.

(21) Appl. No.: 11/788,677

(22) Filed: Apr. 20, 2007

(65) Prior Publication Data

US 2008/0262978 A1 Oct. 23, 2008

(51) Int. Cl.
*G07B 17/02* (2006.01)
*G06F 17/00* (2006.01)
*B65B 35/00* (2006.01)

(52) U.S. Cl. ......................... 705/406; 705/410; 705/401

(58) Field of Classification Search .................. 705/401, 705/406, 410
See application file for complete search history.

(56) References Cited

U.S. PATENT DOCUMENTS 5,121,328 A 6/1992 Sakai et al.
5,238,123 A 8/1993 Tovini et al.
5,734,476 A 3/1998 Dlugos
5,770,864 A 6/1998 Dlugos
5,777,746 A 7/1998 Dlugos
5,793,652 A 8/1998 DeBarber et al.
5,808,912 A 9/1998 Dlugos et al.
5,815,274 A 9/1998 Dlugos
5,841,541 A 11/1998 Dlugos
5,878,379 A 3/1999 Dlugos et al.
(Continued)

FOREIGN PATENT DOCUMENTS

WO WO 2006084484 A1 * 8/2006

OTHER PUBLICATIONS

Royal Mail's Proposal to Introduce Size Based Pricing, Apr. 2004, available at: http://www.psc.gov.uk/policy-and-consultations/consultations/pricing-in-proportion/SBPsummary.pdf.*

(Continued)

*Primary Examiner* — John W Hayes
*Assistant Examiner* — Kevin Flynn
(74) *Attorney, Agent, or Firm* — Brian A. Lemm; Charles R. Malandra, Jr.

(57) ABSTRACT

A mail processing system that includes dimensional rating capability that provides true length support for carrier rates to prevent improper classification of mail pieces. The mail processing system determines a first dimension, parallel to the path of travel, and a second dimension, transverse to the path of travel, of a mail piece. The first dimension and second dimension are compared to each other to determine which is greater. The greater of the two dimensions is assigned to be the length of the mail piece, regardless of the orientation of the mail piece. The format of the mail piece is then determined based on a comparison of the assigned length and assigned width dimensions to maximum dimensions specified by a format table. Based on the determined format of the mail piece, a delivery fee is then calculated, and an indicium can be generated for the mail piece.

8 Claims, 4 Drawing Sheets

U.S. PATENT DOCUMENTS

| | | | | |
|---|---|---|---|---|
| 5,909,013 | A | 6/1999 | Dlugos | |
| 5,914,463 | A | 6/1999 | Dlugos | |
| 6,006,210 | A | 12/1999 | Freeman et al. | |
| 6,135,292 | A | 10/2000 | Pettner | |
| 6,403,907 | B1 * | 6/2002 | Tanimoto | 209/586 |
| 6,832,213 | B2 * | 12/2004 | Freeman et al. | 705/410 |
| 2006/0112023 | A1 * | 5/2006 | Horhann et al. | 705/407 |

OTHER PUBLICATIONS

Sizing template user guide, Royal Mail Group, 2006, available at: http://www.neopost.co.uk/documents/object__2995/Pip__User__Guide.pdf.*

International Paper Knowledge Center (accessed Oct. 26, 2005, available at: http://web.archive.org/web/20051026230345/http://glossary.ippaper.com/default.asp?req=knowledge/article/295).*

* cited by examiner

MAIL PROCESSING SYSTEM INCLUDING DIMENSIONAL RATING WITH TRUE LENGTH SUPPORT

FIELD OF THE INVENTION

The invention disclosed herein relates generally to mail processing systems, and more particularly to mail processing systems that include dimensional rating capabilities with true length support.

BACKGROUND OF THE INVENTION

Mail processing systems for preparing mail pieces, including the functions of generating and printing evidence of payment for delivery (also referred to as indicia) on mail pieces, including, for example, envelopes, flats, postcards, and other items, have long been well known and have enjoyed considerable commercial success. There are many different types of mail processing systems, ranging from relatively small units that handle only one mail piece at a time, to large, multi-functional units that can process thousands of mail pieces per hour in a continuous stream operation. The larger mailing machines often include different modules that automate the processes of producing mail pieces, each of which performs a different task on the mail piece. The mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

Various postal services and private delivery services (referred to herein collectively as “carriers”) throughout the world have developed rating systems which are used to determine the fee associated with the delivery of a particular mail piece. Generally, conventional rating systems utilize a variety of different parameters or factors which influence the fee structure, such as: weight of the mail piece, desired class of service (as examples, first class or third class in the United States), and destination of the mail piece. Some carriers use rating systems that also utilize the dimensions of a mail piece, e.g., length, width, and thickness, in determining the fee for delivery of a mail piece. Rating of mail pieces based on the dimensions of the mail piece is commonly referred to as dimensional rating. The carriers generally communicate the rating systems in the form of tables or charts, which are updated periodically to reflect new pricing or changes in the rating parameters.

To process mail pieces utilizing dimensional rating systems, mail processing systems have been developed that include one or more sensors capable of determining one or more dimensions of a mail piece. The determined dimensions are then used to determine, based on the appropriate rate tables or charts, the fee for delivery of each mail piece. Such mail processing systems are disclosed, for example, in U.S. Pat. Nos. 6,832,213 and 6,006,210. Such mail processing systems have a mail piece processing path that includes a conveyor apparatus that feed mail pieces along a feed deck past a print head module for printing of an indicium that evidences payment for delivery of each mail piece. A registration wall is located substantially perpendicular to the feed deck, such that the top edge of the mail piece is registered along the registration wall to ensure an indicium is printed in the correct location. The mail pieces are fed into the mail processing system in either landscape or portrait orientation such that the indicium will be printed parallel to the address block. The side of the mail piece that is specified as the length is the side that is registered against the registration wall, referred to as the top edge of each mail piece. Sensors located along the feed deck are used to determine both the length and width of each mail piece, and surcharges can be added to the delivery fee for oversized mail pieces.

While such systems generally work well for dimensional rating of mail pieces, there are issues that arise based on the requirements of various carriers, which may assign the length and width to different sides of each mail piece. Some carriers, such as, for example, the United States Postal Service (USPS), specify that the length of each mail piece is always the side that is parallel to the address block (regardless of the orientation of the mail piece). Thus, for mail pieces 10 and 12 illustrated in FIG. 1, the sides 14, 16, respectively, are determined to be the length. Other carriers, such as, for example, the United Kingdom’s Royal Mail, specify that the length of each mail piece is always the longest side of the mail piece (regardless of the orientation of the mail piece). Thus, for mail piece 10, the side 14 is determined to be the length, but for mail piece 12, the side 18 is determined to be the length. The specification of the longest side of the mail piece always being the length, irrelevant of how the mail piece is oriented when fed into a mail processing system, is referred to as “true length.”

In conventional mail processing systems in which the top edge of the mail piece is always specified as the length, the potential for improper rating of mail pieces exists when carrier rates are based on true length. Table I below illustrates an example of a format table based on maximum length and width parameters for an exemplary class of service offered by a carrier. Each class of service offered can have different formats, and different fees. Within each class, the rate applied for delivery of a mail piece is based in part on the format of the mail piece, e.g., the length and width, and also possibly the thickness and actual weight. As can be seen from Table I, when a mail piece is less than or equal to the maximum length of 240 mm and maximum width of 165 mm, it is classified as a Letter and will be rated in the Letter Category. If either of the width or length exceeds the maximum dimension for the Letter Category, the mail piece will be classified as a Flat and will be rated in the Flat Category, which has higher delivery fees than the Letter Category. If either of the width or length exceeds the maximum dimensions for the Flat Category, then the mail piece will be classified as a Parcel and will be rated in the Parcel Category, which has higher delivery fees than the Flat Category.

TABLE 1

| | Max. Length, mm | Max. Width, mm |
|---|---|---|
| Letter | 240 | 165 |
| Flat | 353 | 250 |
| Parcel | >353 | >250 |

Referring again to FIG. 1, suppose mail pieces 10 and 12 have identical dimensions of 220 mm by 160 mm, but as illustrated are oriented differently when fed into a conventional mail processing system. For carrier rates that do not utilize true length support, when mail piece 10 (landscape orientation) is fed into a conventional mail processing system, the top edge 14 will be determined to be the length, and mail piece 10 will be classified as a Letter, since the length does not exceed the maximum of 240 mm and the width does not exceed the maximum of 165 mm specified for the Letter Category. When mail piece 12 (portrait orientation) is fed into a conventional mail processing system, the top edge 16 will be determined to be the length, and mail piece 12 will be classified as a Flat, since the width (as determined by the mail processing system) exceeds the maximum of 165 mm for a Letter, but does not exceed the maximum of 250 mm for a Flat.

For carrier rates that are based on true length, the classification of mail piece 10 will be correct, since the top edge 14 also happens to be the longest edge of the mail piece 10. However, conventional mailing systems will improperly classify mail piece 12 when rates are based on true length. As noted above, for rates based on true length, the orientation of the mail piece does not matter—the longest side is always deemed to be the length. Mail piece 12 should be classified as a Letter, since the side edge 18, being longer than the top edge 16, should be determined to be the length (and does not exceed 240 mm) and the top edge 16 should be determined to be the width (and does not exceed 165 mm). Because conventional mail processing systems always specify the top edge, e.g., edge 16 of mail piece 12, as the length, the width of mail piece 12 will be determined to be side 18. Since the width exceeds the maximum dimension for a Letter, mail piece 12 will be classified as a Flat, when as noted above mail piece 12 should be classified as a Letter. The improper classification of mail piece 12 as a Flat instead of a Letter results in an overpayment of fees by the mailer for delivery of mail piece 12 by the carrier. Other improper classifications also occur when a mail piece would be improperly rated as a Parcel instead of a Flat, e.g., mail piece 12 with side 16 being 250 mm or less and side 18 exceeding 250 mm. Such errors lead to dissatisfaction with conventional mail processing systems, as the result is an unnecessary waste of funds by the mailers.

Thus, there exists a need for a mail processing system that includes dimensional rating capability that can provide true length support for carrier rates to prevent the improper classification of mail pieces.

SUMMARY OF THE INVENTION

The present invention alleviates the problems associated with the prior art and provides a mail processing system that includes dimensional rating capability that can provide true length support for carrier rates to prevent improper classification of mail pieces.

In accordance with embodiments of the present invention, the mail processing system determines a first dimension, parallel to the path of travel, and a second dimension, transverse to the path of travel, of a mail piece. The first dimension and second dimension are compared to each other to determine which is greater. The greater of the two dimensions is assigned to be the length of the mail piece, regardless of the orientation of the mail piece. The format of the mail piece is then determined based on a comparison of the assigned length and assigned width dimensions to maximum dimensions specified by a format table. Based on the determined format of the mail piece, a delivery fee is then calculated. An indicium can then be generated and printed on the mail piece. Because the length is assigned to the longest side of each mail piece, the mail piece will be properly classified with respect to the format, resulting in the payment of proper fees for delivery of the mail piece.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
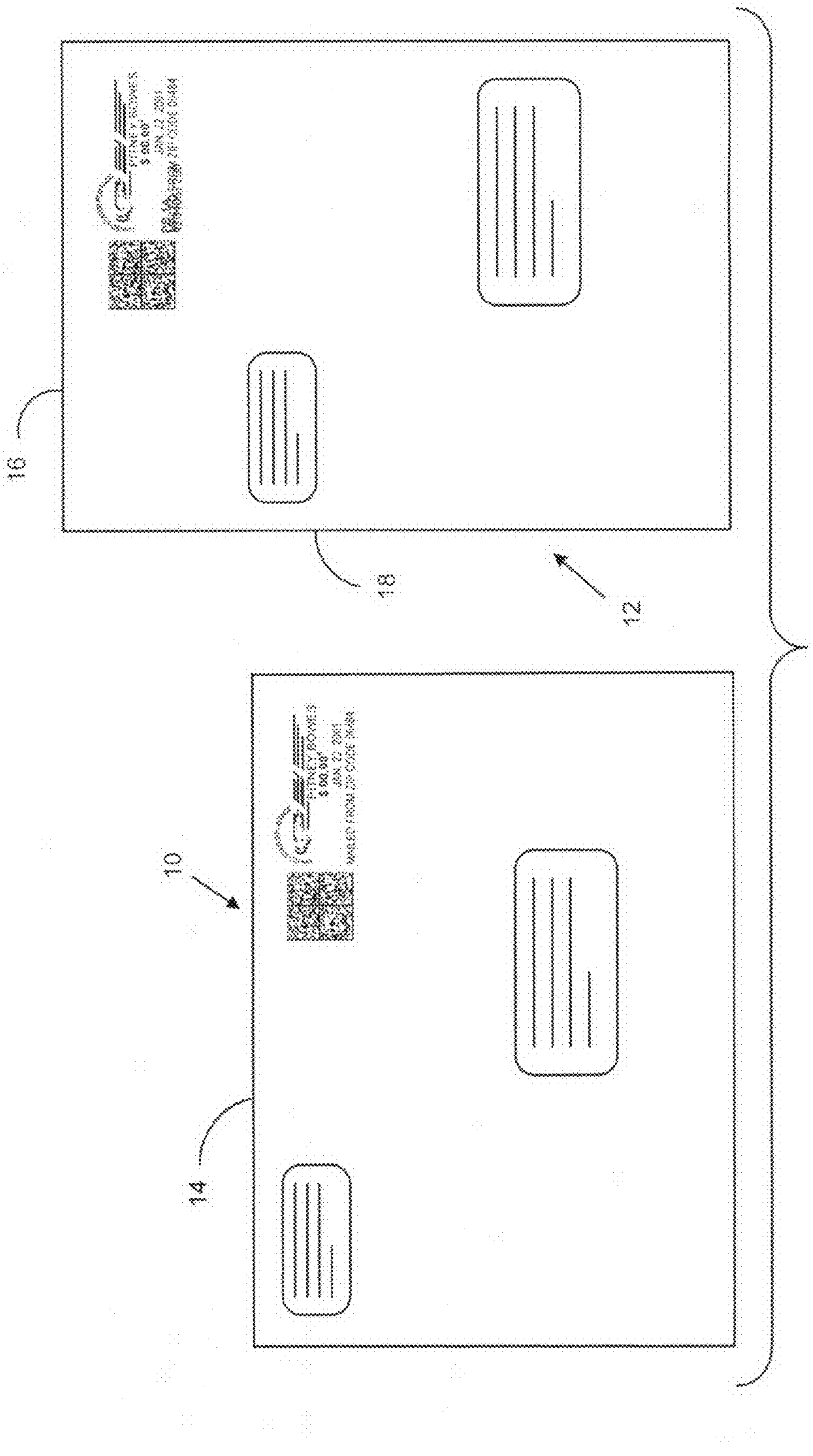
FIG. 1 illustrates mail pieces in landscape and portrait orientations.
Figure 2:
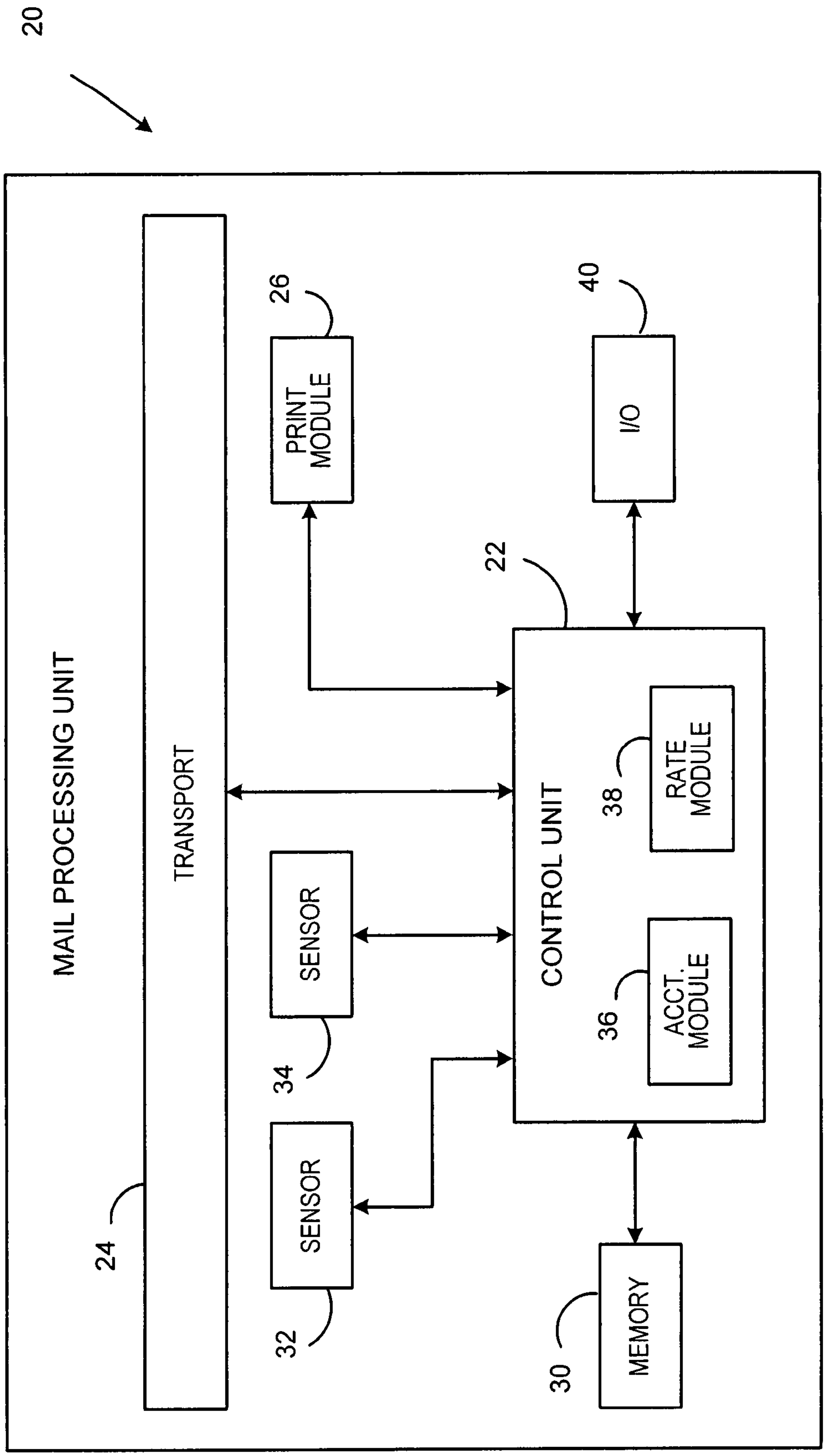
FIG. 2 illustrates in block diagram form portions of an exemplary mail processing system according to an embodiment of the present invention.

In describing the present invention, reference is made to the drawings, wherein there is seen in FIG. 2 a block diagram of portions of mail processing system 20 according to an embodiment of the present invention. Mail processing system 20 includes a control unit 22, a transport 24, and a print module 26, and an input/output (I/O) device 40. Control unit 22, which can include one or more general or special purpose processors or the like, controls operation of the mail processing system 20 using instructions and data stored in a memory unit 30. Memory 30 can include one or more of any type of storage devices, including, for example, ROM, RAM, Flash memory or any combination thereof. The transport 24, which may be, for example, conventional rollers and/or belts, transports mail pieces in seriatim fashion through the mail processing system and past the print module 26 for printing of an indicium that evidences payment of appropriate delivery fees thereon. One or more portions of the transport 24 may be adapted for determining the thickness of the mail pieces, using, for example, rotary encoders (not shown) that measure the displacement of rollers as the mail pieces pass between them. The print module 26 is preferably an ink jet print head type having a plurality of ink jet nozzles (not shown) for ejecting droplets of ink in response to appropriate signals. I/O 40 can be any conventional input/output device, including, for example, a display, keyboard, or the like.

Control unit 32 includes an accounting module 36 and a rate module 38, which may be, for example, memory devices similar to memory device 30. The rate module 38 contains the necessary information pertaining to the rating system of the carriers supported by the mail processing system 20. This rating system information includes the dimensional rating requirements of the carrier. The accounting module 36 keeps track of funds by maintaining a descending register which stores an amount of funds available for use and an ascending register which stores a total amount of funds dispensed over the life of the mail processing system 20. Funds may be added to the descending register by any conventional means.

The mail processing system 20 further includes one or more sensors 32, 34 that are located along the transport 24 to provide signals to the control unit 22. Preferably, the sensors 32, 34 are any conventional optical type sensors that include a light emitter and a light detector, but it should be understood that any type of sensor arrangement or combination of sensors can be utilized. Sensor 32 preferably includes a light emitter and a light detector located in opposed relationship on opposite sides of the path of travel of a mail piece such that a mail piece passes therebetween. By measuring the amount of light that the light detector receives, the presence or absence of a mail piece can be determined. The emitter and detector of sensor 32 are positioned such that the control unit 22 can determine, based on the signals provided by the sensor 32, the dimension of a mail piece parallel to the path of travel (based on, for example, detecting the lead and trail edges of a mail piece). Sensor 34 is preferably formed of an array assembly mounted in any conventional fashion to be flush with the feed deck (FIG. 3) and extending generally transverse to the path of travel. The array of sensor 34 includes a plurality of conventional reflective optical type sensors spaced along the length the array. Each optical sensor of sensor 34 preferably includes a light emitter and a respective light detector. Generally, the light emitter and the light detector are located adjacent to each other so that the light detector receives light reflected back from the light emitter. By measuring the amount of light that the light detector receives, the presence or absence of a mail piece can be determined. Based on the signals received from one or more optical sensors of the array assembly of sensor 34, the control unit 22 can determine the dimension of a mail piece transverse to the path of travel. A complete description of exemplary sensors 32, 34 and the operation thereof can be found in U.S. Pat. Nos. 6,006,210 and 6,832,213, the entirety of which are herein incorporated by reference.

Figure 3:
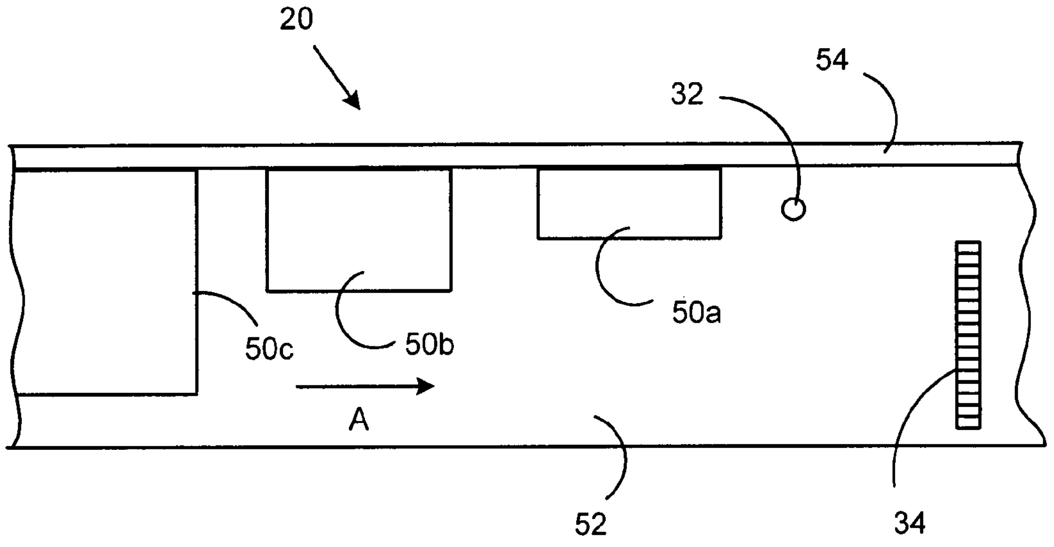
FIG. 3 is a simplified schematic of a plan view of a sequence of mail pieces in transit through the mail processing system of FIG. 2.

FIG. 3 illustrates a schematic of a plan view of a sequence of mail pieces 50*a*, 50*b* and 50*c* in transit through a portion of the mail processing system 20. The sequence of mail pieces 50*a*, 50*b* and 50*c* are fed along a feed deck 52 in the path of travel as indicated by arrow A by the transport 24 (not shown). The top edge of each mail piece is aligned with registration wall 54. As noted above, sensor 32 is positioned such that the mail pieces will pass between the emitter and detector to allow measurement of a first dimension of each mail piece, the first dimension being parallel to the path of travel. Sensor 34, comprising an array of sensors, is flush with the feed deck 52. Preferably, the optical sensor pairs of sensor 34 are spaced approximately 4 mm apart from each other, and extend across the feed deck 52 such that the sensor 34 can detect the edge of mail pieces for which the mail processing system 20 was designed to process, e.g., starting at approximately 9 cm from the registration wall 54 and ending at approximately 26 cm from the registration wall. The spacing of 4 mm allows sufficient granularity to detect most break points specified by carriers throughout the world, but it should be understood that other spacing can be provided as desired. Based on the response of the sensor 34, a second dimension of each mail piece, transverse to the path of travel, can be determined. Preferably, only those sensors in the array located at points that correspond to specific break points (or just outside of the specific break points) for the different formats of the desired class are selectively energized. While this does not result in an actual measurement of the second dimension of a mail piece, it accurately identifies whether or not a mail piece exceeds the maximum dimension specified for each format. For purposes of this specification, determination of the dimension of the mail piece can include both an actual measurement of the dimension by activating all of the sensors in the array of sensor 34, or an approximation of the dimension based on the location of the edge of the mail piece between two breakpoints by activating only those sensors associated with specified breakpoints. The use of the sensors located just outside of the break points ensures that mail pieces that are right at the break point would still be properly classified as within that break point, since the maximum dimensions specified by carriers must be less than or equal to the specified break points. Thus for example, for a break point of 165 mm, it is preferable to activate the sensor pair just outside of 165 mm, e.g., 169 mm.

In conventional mailing systems that do not provide true length support, a sensor similar to sensor 34 would always be used to determine the width dimension. Thus, only those sensors in the array that correspond to width beak points as identified by the format tables, e.g., 165 mm and 250 mm from Table I, would be activated. In this manner, the sensor 32 can be used to determine the dimension of each mail piece 50*a*, 50*b*, and 50*c* parallel to the path of travel (designated the length), and the sensor 34 can be used to determine if the dimension of each mail piece 50*a*, 50*b*, and 50*c* in the direction transverse to the path of travel (designated the width) is less than 165 mm (if neither of the activated sensors of the array detect the mail piece), between 165 and 250 mm (if the sensor located just beyond 165 mm detects the mail piece but the sensor located just beyond 250 mm dos not detect the mail piece), or greater than 250 mm (if both of the activated sensors of the array detect the mail piece). As will be described below, for mail processing system 20 that provides true length support, those sensors in the array of sensor 34 that correspond to both the width and length break points as identified by the format tables are activated, since the dimension of the mail piece transverse to the path of travel may be deemed as either the length or the width.

Figure 4:
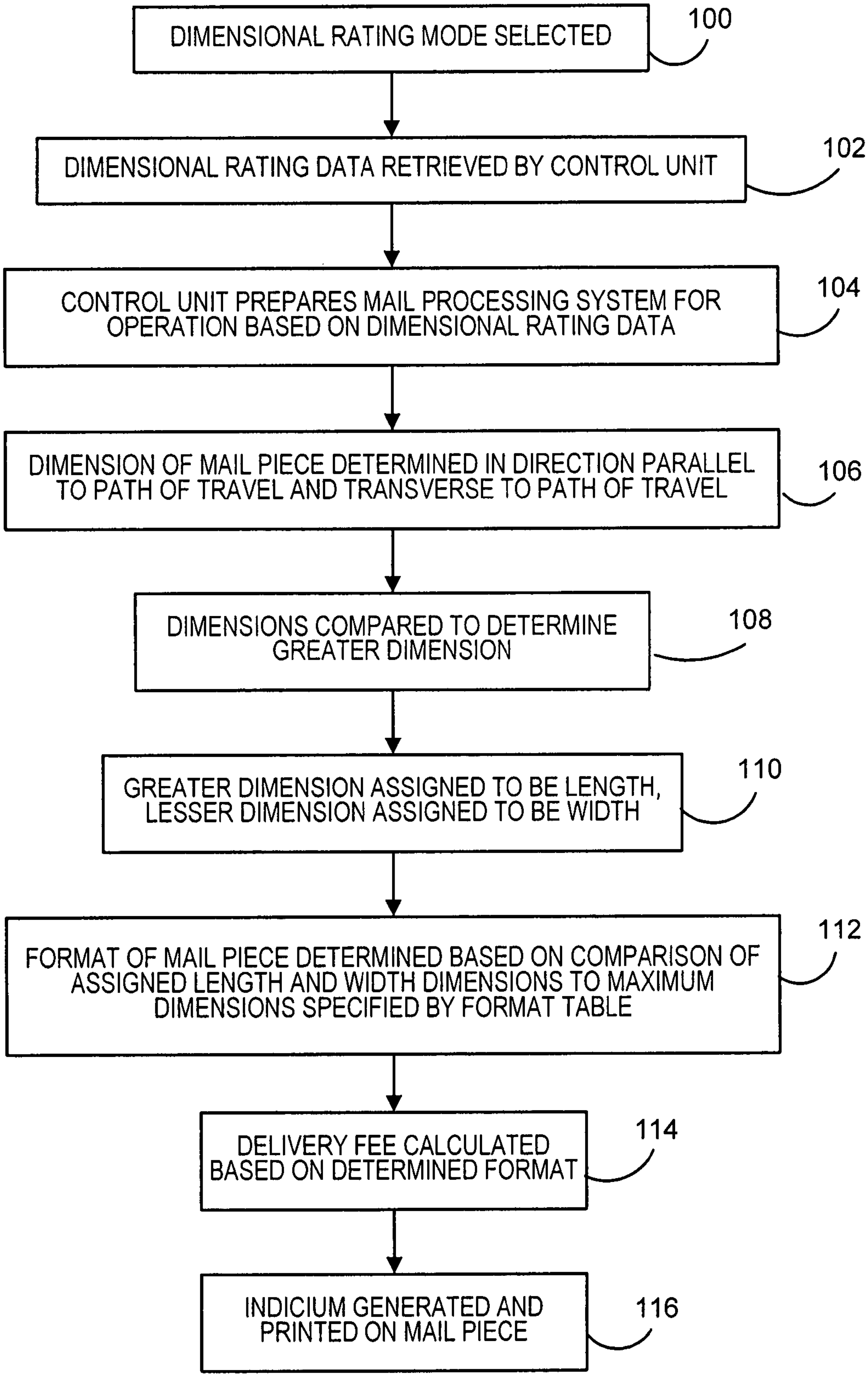
FIG. 4 illustrates in flow diagram form the processing performed by the mail processing system of FIG. 2.

FIG. 4 illustrates in flow diagram form the processing performed by the mail processing system 20 when operating in a dimensional rating mode with true length support. In step 100, the mail processing system 20 enters into a dimensional rating mode based on an input from the user. When a dimensional rating mode is selected by the user, each mail piece will be weighed, identified as to size, and automatically rated by the mail processing system 20. In step 102, dimensional rating data is retrieved by the control unit 22 from the rate module 38 and/or memory 30. The dimensional rating data includes the dimensional limits provided by a carrier with respect to length, width, and thickness for each mail piece format for supported classes, all valid weight breaks for supported classes, and the associated fees for delivery. The dimensional rating data also includes an indication as to whether or not the carrier rates are based on true length or not.

In step 104, the control unit 22, based on the retrieved dimensional rating data, prepares the mail processing system 20 for operation in the appropriate dimensional rating mode. For example, when true length support is required by the carrier, the control unit 22 obtains the length and width breaks, e.g., from a format table similar to Table I above, and activates the appropriate sensors within sensor 34. Specifically, as noted above, those sensors in the array of sensor 34 that correspond to both the width and length break points as identified by the format table are activated, since the dimension of the mail piece transverse to the path of travel may be deemed as either the length or the width. Thus, for example from Table I above, sensors located preferably just beyond 165 mm, 240 mm, 250 mm and 353 mm (if provided) are activated. Thus, for example, sensors located at 169 mm, 244 mm and 254 mm from the registration wall 54 are activated. Because of size limitations of the feed deck 52, in some situations there is insufficient depth to provide a sensor for the 353 mm location, and as such the array of sensors of sensor 34 may not extend to that point.

In step 106, as a mail piece, e.g., mail piece 50*a*, 50*b*, or 50*c*, is being processed by the mail processing system 20, sensor 32 is utilized to determine the dimension of the mail piece in the direction parallel to the path of travel. Since this dimension is based on detection of the leading and trailing edges of the mail piece, a reasonably accurate measurement of the actual dimension can be made. The sensor 34 is used to determine an approximate dimension of the mail piece in the direction transverse to the path of travel, based on the response of the individual sensors of sensor 34 previously activated in step 104. For example, if the sensor located 169 mm from the registration wall 54 does not detect the presence of a mail piece, the mail piece is deemed to have a dimension transverse to the path of travel of not greater than 165 mm. If the sensor located 169 mm from the registration wall does detect the presence of a mail piece, but the sensor located 244 mm from the registration wall does not detect the mail piece, the mail piece is deemed to have a dimension transverse to the path of travel of greater than 165 mm but less than or equal to 240 mm. If the sensor located 244 mm from the registration wall does detect the presence of a mail piece, but the sensor located 254 mm from the registration wall does not detect the mail piece, the mail piece is deemed to have a dimension transverse to the path of travel of greater than 240 mm but less than or equal to 250 mm. If the sensor located 254 mm from the registration wall detects the presence of a mail piece, the mail piece is deemed to have a dimension transverse to the path of travel of greater than 250 mm.

Thus, based on the response from the activated portions of sensor 34, the control unit 22 can determine an approximate dimension of each mail piece in the direction transverse to the path of travel. In step 108, the control unit 22 determines which of the obtained dimensions is greater. Since the dimension obtained transverse to the path of travel is just an estimate within a range of dimensions, the control unit 22 assigns a specific value to this dimension to compare it with the dimension obtained parallel to the path of travel. Table II below provides exemplary values assigned for each estimate.

TABLE II

| Estimated dimension | Assigned Dimension for use in comparison |
|---|---|
| ≦165 | 0 |
| >165 but ≦240 | 169 |
| >240 but ≦250 | 243 |
| >250 | 251 |

Thus, for example, if the dimension transverse to the path of travel is determined to be not greater than 165 mm, the control unit 22 assigns a value of zero for use in comparing with the measured dimension parallel to the path of travel. Since the rating is performed based on specified break points, it does not matter what the actual measurement is, as long as it falls within the range specified by the break points. In step 110, the greater of the two dimensions is assigned to be the length, and the lesser of the two dimensions is assigned to be the width. If the two dimensions are both within the same range, then either can be assigned to be the length, as it will not have any impact on format determination.

Once it is determined which dimension (parallel to the path of travel or transverse to the path of travel) is assigned to be the length, then in step 112 the assigned length is compared against the maximum length dimensions of the appropriate format table, e.g., for the class selected by the user to rate the mail piece, and the assigned width is compared with the maximum width dimensions, to determine the format with which the mail piece complies. Table III below illustrates examples of format determination for various sized mail pieces using as an example the length and width breaks as specified in Table 1. As shown in Table III, the first column indicates the actual size of a mail piece, in mm, in a first dimension that is parallel to the path of travel (designated X side), and the second column indicates the actual size of each mail piece, in mm, in a second dimension that is transverse to the path of travel (designated Y side). The third column indicates the measurement of the first dimension as provided by sensor 32, and the fourth column indicates the value assigned by the control unit 22, as described above, for the dimension transverse to the path of travel. The fifth column indicates which side, X or Y, is deemed to be the length for true length support. The sixth column indicates the format in which a mail piece would be classified when the carrier rating utilizes true length support. The seventh column indicates the format in which a mail piece would be classified when the carrier rating does not utilize true length support.

TABLE III

| Actual Dimension (mm), parallel to path of travel (X side) | Actual Dimension (mm), transverse to path of travel (Y side) | Dimension provided by sensor 32 | Value assigned by control unit to dimension transverse to path of travel | Side deemed to be length for true length support | Format with true length support | Format without true length support |
|---|---|---|---|---|---|---|
| Up to 165 | Up to 165 | 0 < X ≦ 165 | 0 | X | Letter | Letter |
| Up to 165 | >165 but ≦240 | 0 < X ≦ 165 | 169 | Y | Letter | Flat |
| Up to 165 | >240 but ≦250 | 0 < X ≦ 165 | 243 | Y | Flat | Flat |
| Up to 165 | >250 | 0 < X ≦ 165 | 251 | Y | Flat | Parcel |
| >165 but ≦240 | Up to 165 | 165 < X ≦ 240 | 0 | X | Letter | Letter |
| >165 but ≦240 | >165 but ≦240 | 165 < X ≦ 240 | 169 | X or Y | Flat | Flat |
| >165 but ≦240 | >240 but ≦250 | 165 < X ≦ 240 | 243 | Y | Flat | Flat |
| >165 but ≦240 | >250 | 165 < X ≦ 240 | 251 | Y | Flat | Parcel |
| >240 but ≦250 | Up to 165 | 240 < X ≦ 250 | 0 | X | Flat | Flat |
| >240 but ≦250 | >165 but ≦240 | 240 < X ≦ 250 | 169 | X | Flat | Flat |
| >240 but ≦250 | >240 but ≦250 | 240 < X ≦ 250 | 243 | X or Y | Flat | Flat |
| >240 but ≦250 | >250 | 240 < X ≦ 250 | 251 | Y | Flat | Parcel |
| >250 | Up to 165 | >250 | 0 | X | Flat | Flat |
| >250 | >165 but ≦240 | >250 | 169 | X | Flat | Flat |

TABLE III-continued

| Actual Dimension (mm), parallel to path of travel (X side) | Actual Dimension (mm), transverse to path of travel (Y side) | Dimension provided by sensor 32 | Value assigned by control unit to dimension transverse to path of travel | Side deemed to be length for true length support | Format with true length support | Format without true length support |
|---|---|---|---|---|---|---|
| >250 | >240 but ≦250 | >250 | 243 | X | Flat | Flat |
| >250 | >250 | >250 | 251 | X or Y | Parcel | Parcel |

Once the appropriate format of a mail piece has been identified based on length and width, the control unit 22 uses this information, combined with the weight and maximum thickness requirements, in step 114, to determine the proper fee for delivery of the mail piece. As can be seen from Table III, there are several instances where a conventional mail processing system that does not provide true length support would improperly identify the format for a mail piece, which would result in the user paying additional unnecessary fees for delivery of the mail piece. Mail processing system 20, utilizing the processing described above for providing true length support, accurately identifies the correct format for each mail piece. Thus, the information used by the control unit 22 to rate each mail piece is accurate, and the improper rating of mail pieces is prevented. In step 116, an indicium generated by the control unit 22 that reflects the proper delivery fee is printed on the mail piece by the print module 26.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A method for determining a rate for delivery of a mail piece using a mail processing system, the mail processing system having a path of travel along which mail pieces are transported for processing, the method comprising:

determining, by a control unit of the mail processing system, a first dimension of a mail piece, the first dimension being parallel to the path of travel;

determining, by the control unit of the mail processing system, a second dimension of the mail piece by determining a range of values in which the second dimension is located and assigning a value based on the range of values, the second dimension being transverse to the path of travel;

determining, by the control unit of the mail processing system, a greater of the first and second dimension by comparing the first dimension with the assigned value for the second dimension;

assigning, by the control unit of the mail processing system, the greater of the first and second dimension to be a length of the mail piece, and assigning a lesser of the first and second dimension to be a width of the mail piece;

comparing, by the control unit of the mail processing system, the assigned length and the assigned width of the mail piece to rating information provided by a carrier to determine a format for the mail piece, the rating information including maximum dimensions for length and width of mail pieces for different formats; and using, by the control unit of the mail processing system, the determined format to determine a rate for delivery of the mail piece.

2. The method of claim 1, further comprising:

generating an indicium that reflects the determined rate for delivery of the mail piece; and printing the generated indicium on the mail piece.

3. The method of claim 1, wherein determining a range of values further comprises:

activating a plurality of sensors located transverse to the path of travel, each of the plurality of sensors corresponding to a maximum dimension for length and width specified in the rating information; and monitoring each of the plurality of sensors to determine the range of values in which the second dimension is located.

4. The method according to claim 3, wherein each of the plurality of sensors that are activated are located outside of the maximum dimension for length and width.

5. The method according to claim 1, wherein determining a first dimension further comprises:

detecting a leading edge and trailing edge of the mail piece, and determining the first dimension based on detection of the leading and railing edges of the mail piece.

6. A mail processing system comprising:

a feed deck defining a path of travel along which mail pieces are transported for processing;

a memory device for storing rating information provided by a carrier for mail pieces, the rating information including maximum dimensions for length and width of mail pieces for different formats;

a control unit configured for:

determining a first dimension of a mail piece located along the feed deck, the first dimension being parallel to the path of travel;

determining a second dimension of the mail piece located along the feed deck by determining a range of values in which the second dimension is located and assigning a value based on the range of values, the second dimension being transverse to the path of travel;

determining a greater of the first and second dimension by comparing the first dimension with the assigned value for the second dimension;

assigning the greater of the first and second dimension to be a length of the mail piece, and assigning a lesser of the first and second dimension to be a width of the mail piece;

comparing the assigned length and the assigned width of the mail piece to the rating information stored in the memory device to determine a format for the mail piece; and determining a rate for delivery of the mail piece using the determined format.

7. The mail processing system of claim 6, further comprising:

wherein said control unit is further configured for generating an indicium that reflects the determined rate for delivery of the mail piece; and a printing device to print the generated indicium on the mail piece.

8. The mail processing system of claim 6, further comprising:

a plurality of sensors located transverse to the path of travel, each of the plurality of sensors corresponding to a maximum dimension for length and width specified in the rating information.

* * * * *